United States Patent
Korala (10) Patent No.: US 9,600,981 B2
(45) Date of Patent: Mar. 21, 2017

(54) USER TERMINAL SYSTEM

(71) Applicant: Korala Associates Limited, Edinburgh (GB)

(72) Inventor: Aravinda Korala, Edinburgh (GB)

(73) Assignee: KORALA ASSOCIATES LIMITED, Edinburgh (GB)

( * ) Notice: Subject to any disclaimer, the term of this patent is extended or adjusted under 35 U.S.C. 154(b) by 226 days.

(21) Appl. No.: 14/368,343

(22) PCT Filed: Dec. 18, 2012

(86) PCT No.: PCT/GB2012/053176
§ 371 (c)(1),
(2) Date: Jun. 24, 2014

(87) PCT Pub. No.: WO2013/098556
PCT Pub. Date: Jul. 4, 2013

(65) Prior Publication Data
US 2014/0374477 A1    Dec. 25, 2014

(30) Foreign Application Priority Data

Dec. 30, 2011 (GB) .................................. 1122484.7
Jun. 18, 2012 (GB) .................................. 1210787.6

(51) Int. Cl.
*G07F 17/42* (2006.01)
*G07F 19/00* (2006.01)
(Continued)

(52) U.S. Cl.
CPC ........... *G07F 17/42* (2013.01); *G06Q 20/042* (2013.01); *G06Q 20/105* (2013.01); *G07F 19/20* (2013.01);
(Continued)

(58) Field of Classification Search
USPC ......................................................... 235/379
See application file for complete search history.

(56) References Cited

U.S. PATENT DOCUMENTS 4,385,285 A    5/1983 Horst
6,068,194 A    5/2000 Mazur
(Continued)

FOREIGN PATENT DOCUMENTS

AU    728644    1/2001
WO    9306556    4/1993
(Continued)

OTHER PUBLICATIONS

Search report for GB1210787.6 dated May 29, 2013.
(Continued)

*Primary Examiner* — Michael G Lee
*Assistant Examiner* — David Tardif
(74) *Attorney, Agent, or Firm* — Snell & Wilmer L.L.P.

(57) ABSTRACT

A user terminal for performing a cash withdrawal transaction comprises a reader for reading a user device, a processing resource configured to obtain from the user device account data representative of an account associated with the user device, and to receive a user request for a cash withdrawal in respect of the account, and an output device configured to issue, in response to the user request for a cash withdrawal, a token that is exchangeable for cash.

25 Claims, 3 Drawing Sheets

(51) Int. Cl.
  *G06Q 20/04* (2012.01)
  *G06Q 20/10* (2012.01)
(52) U.S. Cl.
  CPC .......... *G07F 19/203* (2013.01); *G07F 19/205* (2013.01); *G07F 19/207* (2013.01)

(56) References Cited

U.S. PATENT DOCUMENTS

| | | | |
|---|---|---|---|
| 6,536,663 | B1 | 3/2003 | Lozier |
| 7,121,460 | B1 | 10/2006 | Parsons et al. |
| 2002/0174016 | A1 | 11/2002 | Cuervo |
| 2003/0236746 | A1 | 12/2003 | Turner |
| 2004/0087360 | A1 | 5/2004 | Chamberlain et al. |
| 2005/0107155 | A1 | 5/2005 | Potts et al. |
| 2006/0073883 | A1 | 4/2006 | Franks |
| 2007/0181676 | A1 | 8/2007 | Mateen et al. |
| 2009/0201372 | A1 | 8/2009 | O'Doherty et al. |
| 2010/0214413 | A1* | 8/2010 | Lin ................ G07F 19/20 348/150 |
| 2011/0212774 | A1* | 9/2011 | Wudtke ............ G07F 17/3202 463/30 |
| 2013/0124411 | A1* | 5/2013 | Kobres ................ G06Q 40/02 705/43 |

FOREIGN PATENT DOCUMENTS

| | | |
|---|---|---|
| WO | 9960502 | 11/1999 |
| WO | 0209001 | 1/2002 |
| WO | 03071387 | 8/2003 |

OTHER PUBLICATIONS

Examination report for GB1210787.6 dated Nov. 27, 2013.
"Scrip under scrutiny" from ATMmarketplace.com dated Nov. 26, 2013.
"Scrip cash dispenser" from Wikipedia dated Nov. 24, 2013.
International Search Report for PCT/GB2012/053176 dated Mar. 15, 2013.

* cited by examiner

USER TERMINAL SYSTEM

CROSS-REFERENCE TO RELATED APPLICATIONS

This application is a U.S. national phase filing under 35 U.S.C. §371 of PCT/GB2012/053176 filed Dec. 18, 2012. PCT/GB2012/053176 claims priority from GB Application No. 1122484.7 which was filed on Dec. 30, 2011 and GB Application No. 1210787.6 which was filed on Jun. 18, 2012, all of which are incorporated herein by reference in their entirety.

FIELD OF THE INVENTION

The present invention relates to a user terminal that can be used in performing ATM (automated teller machine) cash withdrawal transactions or cash deposit transactions, and to a method and system for performing such transactions.

BACKGROUND TO THE INVENTION

ATM terminals are very widely used, and allow users to withdraw cash and to perform other banking transactions. Usually, in order to withdraw cash a user inserts a financial transaction card, for example a credit or debit card, into an ATM terminal, enters a PIN code, and performs transactions via a sequence of screens displayed on the terminal.

As ATM terminals contain large quantities of cash, they usually include various security mechanisms to discourage theft. For example, ATM terminals are usually constructed to be physically strong and heavy to make removal, or breaking open, of the ATM difficult. More sophisticated, anti-tampering mechanisms are also usually provided to ensure that any tampering with the ATM is detected and may cause shut down of the ATM or generation of an alarm. Many ATMs are embedded within the fabric of a building, for example embedded in an external wall, in order to discourage theft.

ATM terminals are relatively rare in developing countries, and in rural or isolated regions of many developed countries. That is partly because of the difficulty in installing relatively large, heavy and sophisticated ATM terminals and because of the possible lack of suitable technical infrastructure, and also because of the high cost of standard ATM terminals.

Bank agent networks have been developed in some countries, particularly in isolated regions. Bank agent networks are particularly popular in some Latin American countries, for example Brazil and Peru. Bank agents are local entities, often shops and post offices, that are contracted by a financial institution such as a bank to offer certain banking services on behalf of the bank. For example the agent may conduct a banking transaction, such as withdrawal of cash by a user, on behalf of the financial institution. The bank agent has to enter into a contractual relationship with a bank, and usually has to open a dedicated bank agent account with the financial institution. There are often strict requirements for the bank agent to maintain a threshold amount of working capital to underwrite its activities, and the bank agent may be subject to rigorous checks and ongoing scrutiny by the financial institution. However, the day-to-day activities of the bank agent are largely out of the control of the financial institution and the financial institution must rely on the integrity of, and the administrative arrangements used by, the agent.

Cash withdrawal transactions performed by the bank agent to allow a user to withdraw cash from the user's account may be in the form of point-of-sale (POS) transactions. POS transactions are also very widely used throughout the world by non-banking agent retailers to enable customers to purchase products and also, in some cases, to allow customers to withdraw cash as part of a transaction process with the retailer. For example, supermarket customers in the UK often obtain cash-back when paying for goods purchased at a supermarket. In such cash-back or other POS transactions, cash is passed from the supermarket or other retailer to the customer, and the customer's account is debited by an amount equal to the sum of the purchase price of the goods and the amount of the cash-back transaction. The supermarket's, or other retailer's, account is credited in the amount of the cash-back transaction.

There are significant differences between POS transactions and ATM transactions, for example in relation to the charging and distribution of interchange fees.

In the case of a POS transaction, the card issuing bank deducts the interchange fee from the amount it pays the acquiring bank that handles a credit or debit card transaction for a merchant. The acquiring bank then pays the merchant the amount of the transaction minus both the interchange fee and an additional smaller fee.

In contrast, for cash withdrawal transactions ATM fees are paid by the card issuing bank to the acquiring bank.

Furthermore, ATM and POS transactions usually use entirely different protocols for communication and control. The ATM protocol that is used for control of a particular ATM terminal and for sending messages to a server and/or financial institution network may be manufacturer-specific and country-specific. For example, NDC and D912 are ATM protocols that are often used in countries in which NCR and Diebold ATM terminals respectively predominate, for example UK, US, Russia, Eastern Europe, India and some other Asian countries. Many European countries do not use NDC or D912, but have their own national ATM protocols or may use other vendor-specific protocols. Despite the differences between ATM protocols they usually have a core functionality that is similar, and that is distinct from protocols used for POS transactions. For example, ATM protocols provide for reversal operations allowing a transaction to be reversed but, unlike POS protocols, do not allow for refund operations. Furthermore, ATM protocols are usually used to manage the ATM terminal hardware as well as providing for communication, for example an ATM protocol may track cash levels, track performance of components of the ATM terminal and may be used to update or otherwise modify ATM terminal software or reconfigure the ATM terminal.

SUMMARY OF THE INVENTION

In a first aspect of the invention there is provided a user terminal for performing a cash withdrawal transaction comprising a reader for reading a user device, a processing resource configured to obtain from the user device using the reader account data representative of an account associated with the user device, and to receive a user request for a cash withdrawal in respect of the account, and an output device configured to issue, in response to the user request for a cash withdrawal, a token that is exchangeable for cash.

In a second aspect of the invention, which may be provided independently, there is provided a user terminal for performing a cash deposit transaction comprising a reader for reading a user device, a processing resource configured to obtain from the user device using the reader account data representative of an account associated with the user device, and to receive a user request for a cash deposit in respect of the account, and an output device configured to issue, in response to the user request for a cash deposit a token that is representative of the amount of the cash deposit and/or that identifies a further party to whom the cash is to be provided by the user.

The token may be exchangeable for cash in the amount of the cash withdrawal transaction. The account may be a user account associated with the user device.

By providing a user terminal, for example an ATM-type user terminal, that issues a token rather than issuing or receiving cash, ATM-type functionality can be provided without requiring installation of an ATM terminal that contains large quantities of cash, associated security features and cash handling mechanisms. There may be a reduced risk that a third party might attempt to remove or break open the terminal as it is not necessary for the terminal to contain cash. Furthermore, there is a reduced need for the heavy physical casing and weighting associated with ATM terminals. The terminal may be more easily installable in a variety of premises than is the case for ATM terminals. The operation and maintenance of the terminal itself may be simplified in comparison to an ATM terminal, as the mechanism for dispensing a token may be simpler than cash storage and dispensing mechanism of an ATM.

The cash withdrawal or deposit transaction performed by the terminal may comprise issuing of the token and the sending of messages requesting crediting and/or debiting of accounts of the user and/or a further party. An actual transfer of cash to or from the user occurs separately.

The user terminal may be configured to operate in accordance with an ATM protocol. The transaction may comprise a cash withdrawal transaction and the user terminal may be configured to not issue cash to the user upon performance of the cash withdrawal transaction. The transaction may comprise a cash deposit transaction and the user terminal may be configured to not receive cash from the user upon performance of the cash deposit transaction.

The user device may comprise a financial transaction card, for example a credit or debit card. The user device may comprise a chip card and/or may be EMV-compliant, where EMV is the Europay/MasterCard/Visa standard.

The user terminal may be configured so as to store no cash.

The user terminal may include no cash storage device and/or no cash handling mechanism, for example no cash dispensing mechanism or no cash receiving mechanism.

The user terminal may comprise a communications resource, for example for communicating with at least one financial institution, the processing resource may be configured to send at least one message, for example to the at least one financial institution, via the communications resource, and the at least one message may be representative of a request to debit or credit the account of the user in respect of the transaction.

The processing resource may be configured to send at least one message to the at least one financial institution to credit or debit an account of a further party in respect of the transaction.

The token may be exchangeable with the further party for the amount of the transaction.

The crediting and debiting may comprise a back-to-back settlement of the transaction. The crediting and debiting may be performed substantially simultaneously.

The processing resource may be configured to perform a plurality of transactions in respect of a plurality of users, and to send a message to at least one financial institution to credit or debit the account of the further party in the amount of a sum of the plurality of transactions.

The at least one message may comprise at least one message in an ATM protocol message format.

The further party may be associated with the user terminal, and optionally the user terminal comprises a data store storing an identifier that identifies the further party as being associated with the user terminal.

The user terminal may be configured to require the reading of a further user device associated with the further party in order to complete the cash withdrawal transaction or the cash deposit transaction. The user terminal may be configured to monitor for the insertion and/or reading of the further user device and to terminate the transaction before completion if the further user device is not inserted and/or read successfully.

The user terminal may further comprise a video camera. The processing resource may be configured to prompt the user to request the further party to exchange cash with the user in a position that is within the field of view of the video camera. The processing resource may be configured to log video data obtained from the video camera.

The processing resource may be configured to prompt the user to provide at least one user input when the exchange of cash is about to occur and/or when the exchange of cash has been completed.

The token may comprise a time indicator that is representative of a duration of validity of the token.

The output device may comprise a printer and the token may comprise a printed token, for example a printed paper slip.

The user terminal may be configured to issue a receipt, for example representative of the transaction, and the receipt may be separate from the token.

The user terminal may further comprise a receipt printer that is separate from the output device configured to issue the token.

The token may comprise at least one of a paper token, or an electronic token.

The user terminal may further comprise a housing and at least one sensor for detection of tampering with the housing.

In a further aspect of the invention, which may be provided independently, there is provided a method of performing a cash withdrawal transaction comprising reading a user device, obtaining from the user device account data that is representative of an account associated with the user device, receiving a request for a cash withdrawal in respect of the account, debiting the account in the amount of the transaction, and issuing in response to the request for a cash withdrawal a token that is exchangeable for cash.

In another aspect of the invention, which may be provided independently, there is provided a method of performing a cash deposit transaction comprising reading a user device, obtaining from the user device account data that is representative of an account associated with the user device, receiving a request for a cash deposit in respect of the account, crediting the account in the amount of the transaction, and issuing in response to the request for a cash deposit a token that is representative of the amount of the cash deposit and/or that identifies a further party to whom the cash is to be provided by the user.

The method may be performed using a user terminal operating according to an ATM protocol.

The method may further comprise not issuing cash to the user or receiving cash from the user upon performance of the transaction.

The token may be issued by a user terminal and the user terminal may include no cash storage device and/or no cash handling mechanism, for example no cash dispensing mechanism or no cash receiving mechanism The method may further comprise sending at least one message to at least one financial institution, and the at least one message may comprise a request to debit or credit the account of the user in respect of the transaction.

The method may further comprise sending at least one message to at least one financial institution to credit or debit an account of a further party in respect of the transaction.

The method may further comprise exchanging the token with a further party for the amount of the transaction.

The method may further comprise sending a message to at least one financial institution to credit or debit the account of the further party in the amount of a sum of a plurality of cash withdrawal transactions.

The at least one message may comprise at least one message in an ATM message format.

The further party may be associated with the user terminal, and optionally the user terminal comprises a data store storing an identifier that identifies the further party as being associated with the user terminal.

The method may further comprise requiring reading of a further user device associated with the further party in order to complete the cash withdrawal transaction or the cash deposit transaction. The method may comprise determining whether a further user device associated with the further party has been read and not completing the cash withdrawal transaction or the cash deposit transaction if the further user device has not been read/

The method may further comprise prompting the user to request the further party to exchange cash with the user in a position that is within the field of view of a video camera, and logging video data obtained from the video camera.

The method may further comprise prompting the user to provide at least one user input when the transfer of cash is about to occur and/or when the transfer of cash has been completed.

The method may further comprise printing the token.

The method may further comprise issuing a receipt, for example representative of the transaction, wherein the receipt is separate from the token.

The token may comprise at least one of a paper token or an electronic token.

The method may be performed using a user terminal, and the method may further comprise detecting tampering with the user terminal or with at least one component of the user terminal.

In another independent aspect of the invention there is provided a system for performing at least one of a cash withdrawal transaction and a cash deposit transaction, the system comprising a user terminal as claimed or described herein and/or a server system that is configured to communicate with the terminal.

The server system may comprise transaction processing software that is configured to receive and process cash withdrawal messages and/or cash deposit transaction messages. The transaction processing software may be configured to credit or debit accounts in respect of such transactions. The server system may comprise further software for receiving and processing at least one of cash withdrawal messages or cash deposit transaction messages. The further software may be configured to provide cash withdrawal and/or cash deposit instructions to the transaction processing software in response to received cash withdrawal messages and/or cash deposit transaction messages. The further software may be configured to receive a plurality of cash withdrawal messages or a plurality of cash deposit transaction messages and in response to provide a single message to the transaction processing software instructing withdrawal of a single, summed amount or instructing deposit of a single, summed amount. The further software may be configured to convert received messages to a standard format of the transaction processing software. The standard format may comprise a cash withdrawal message format or a cash deposit transaction message format that, optionally, comprises a format of messages received by the transaction processing software from user terminals, for example ATMs.

In another independent aspect of the invention there is provided a computer program product comprising computer readable instructions that are executable to perform a method as claimed or described herein.

There may also be provided an apparatus or method substantially as described herein with reference to the accompanying drawings.

Any feature in one aspect of the invention may be applied to other aspects of the invention, in any appropriate combination. For example, apparatus features may be applied to method features and vice versa.

DETAILED DESCRIPTION OF EMBODIMENTS

Embodiments of the invention are now described, by way of non-limiting example, and are illustrated in the following figures, in which.

Figure 1:
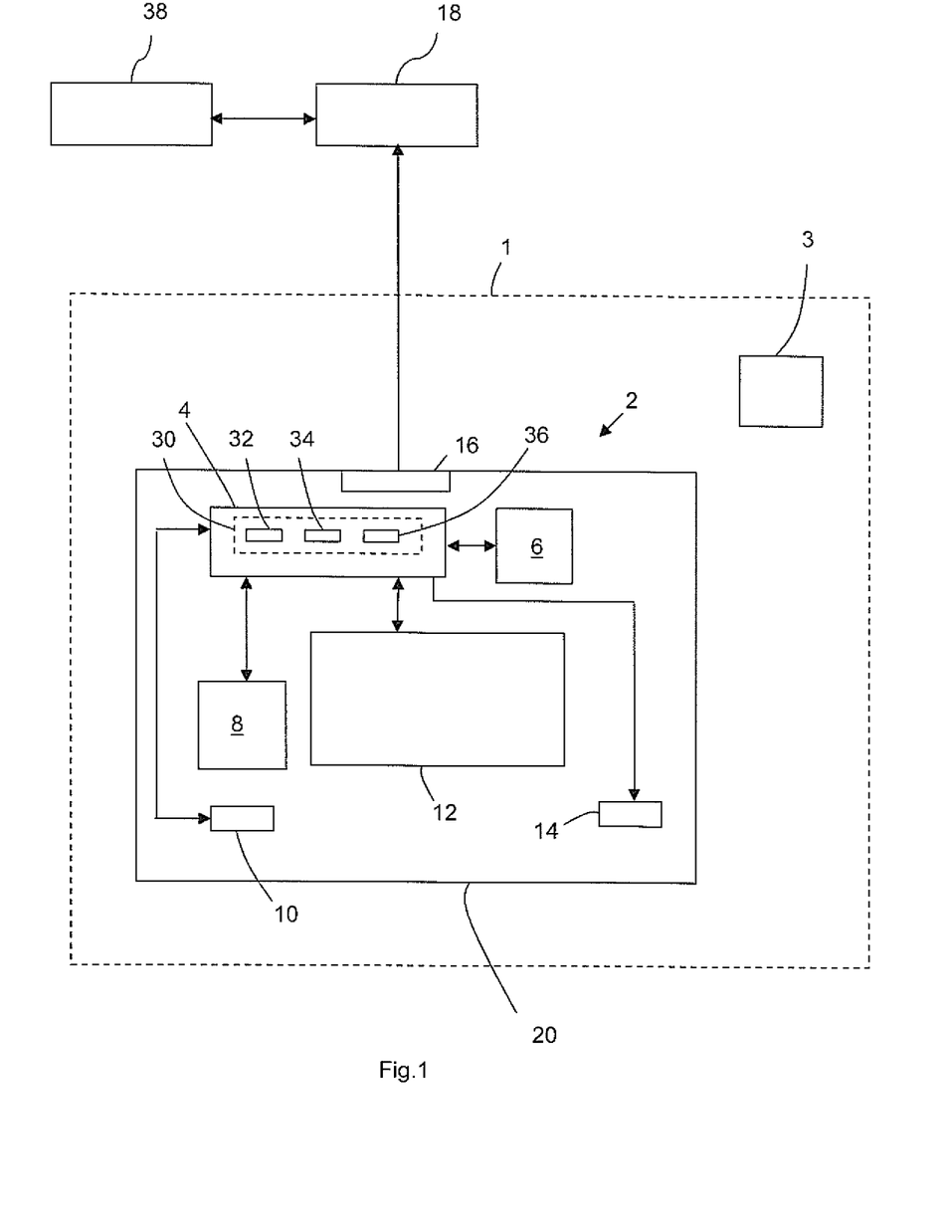
FIG. 1 is a schematic illustration of an embodiment of the invention.

A user terminal 2 in accordance with an embodiment is illustrated schematically in FIG. 1. The user terminal is installed in a merchant's premises 1, for example a shop or post office. A cash register 3 is also installed in the merchant's premises.

The user terminal 2 includes a processor 4 connected to a data store 6. The processor 4 is also connected to an encrypting pin pad (EPP) 8, a card reader device 10, a display 12 and a printer 14.

In the embodiment of FIG. 1, the processor comprises a Windows PC core. The data store 6 comprises a hard disk, the card reader device 10 is an Omron V2BF-01JS-AP1 card reader, the display 12 is a touchscreen display and the printer 14 is an Epson M-T532, MB520. The EPP 8 comprises a PCI-compliant number pad and is operable to securely receive a PIN entered by a user.

Although particular component types and models are included in the embodiment of FIG. 1, any suitable component types and models may be used in alternative embodiments.

The user terminal 2 also includes a communication interface 16 that is configured to enable the user terminal to transmit messages to and receive messages from a server 18 associated with the user terminal network operator responsible for installation and operation of the user terminal 2. The messages are transmitted and received via a secure network connection in accordance with known banking protocols.

The user terminal network operator may be a financial institution, for example a bank. The messages sent between the user terminal 2 and the server 18 may relate to a particular transaction, and may comprise for example authorisation messages or messages comprising instructions to credit or debit an account in relation to a transaction conducted by a user using user terminal 2. In addition, the server 18 can send software installation or update messages that comprise software components for automatic installation at the user terminal 2. The user terminal 2 is also able to send management information to the server 18, comprising for example data representing usage of the user terminal during a particular period, or fault monitoring data.

The user terminal 2 includes a secure housing 20, and the other components of the user terminal 2 are located within the secure housing 20. The user terminal 2 may include various anti-tamper components, for example sensors for detecting tampering, or triggers or switches that operate automatically in case of unauthorised tampering with the housing 20.

In operation, the processor 4 controls operation of the other components of the user terminal 2, under control of application components running on the processor. Upon power-up of the user terminal 2 a basic input-output system (BIOS) is booted from non-volatile storage (not shown) included in the processor 4, and a Windows 7 operating system and application components are installed from the data store 6 by the processor 4 to form a user terminal processing system.

The application components include various application modules 32, 34, 36 that form part of a user terminal application 30 that controls operations relating to user interaction with the user terminal.

The user terminal application 30 forms part of an application layer and is provided under an XFS-compatible application environment, which may be a hardware-agnostic application environment such as KAL Kalignite or a manufacturer-specific application environment.

The software architecture of the user terminal 2 includes various other layers, in accordance with known ATM-type device architectures, including an XFS layer that mediates between the application layer and a hardware device layer. The hardware device layer includes various hardware-specific drivers for controlling operation of the various hardware components of the user terminal 2.

In operation, the user terminal application 30 controls operation of the user terminal 2, including operations associated with performance of a financial transaction by a user such as, for example, reading of the user's card, reading of a user's encrypted PIN, receipt and processing of a user's data such as account balance, overdraft limit and withdrawal limit from server 18, and display of a sequence of display screens on the display 12.

In FIG. 1, three application modules 32, 34 and 36 forming part of the application 30 are shown. The application module 32 controls communication with the server 18, and the processing of data associated with a transaction, including user data received from the server 18. The application module 34 controls the display of transaction screens on the display 12, including selecting and outputting the appropriate transaction screen for a particular point in a transaction process. The application module 36 controls the output of a token to a user at the end of the transaction process. That feature of outputting a token to a user, rather than cash, at the end of a transaction process will be described in more detail below.

Whilst particular modules 32, 34, 36 are described in relation to FIG. 1, in alternative embodiments functionality of one or more of those modules can be provided by a single module or other component, or functionality provided by a single module can be provided by two or more modules or other components in combination.

Figure 2:
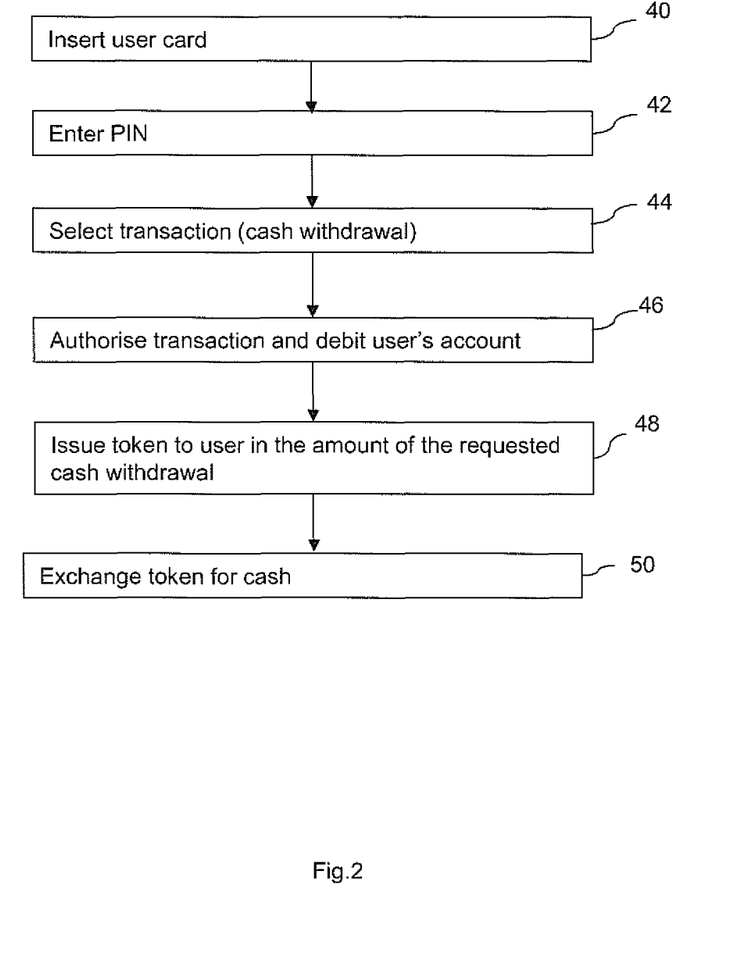
FIG. 2 is a flowchart representing in overview a cash withdrawal transaction performed using the embodiment of FIG. 1.

Operation of the user terminal 2 to perform a user transaction is now described with reference to the flow chart of FIG. 2, which illustrates such a transaction in overview.

At the first stage 40 of the process the user inserts their financial transaction card into the card reader device 10. At stage 42, the application module 34 displays a PIN entry screen on the display 12, and in response the user enters their PIN via the EPP 8.

A sequence of display screens is then displayed on the display 12 by module 34, prompting user interaction for example via a touchscreen on the display 12, again in accordance with known techniques.

At the next stage 44, the user is able to select a cash withdrawal transaction prompted by the user interaction screens, and in this case requests withdrawal of $50.

The module 32 then, at stage 46, transmits a cash withdrawal transaction message or sequence of messages to the server 18. It is a feature of the embodiment of FIG. 1 that the cash withdrawal transaction message is of the same or similar form as a standard cash withdrawal transaction message that may be issued by a known ATM in respect of a known ATM cash withdrawal transaction. The message includes the user's account number and encrypted PIN block, details of the requested transaction type and amount, and may include status information about the transaction device.

The cash withdrawal transaction message or sequence of messages is received at the server 18. The server verifies the card identity and the PIN, and verifies the balance available in the user's account for performance of transactions. The server 18 also determines whether the user's account is held with the financial institution that maintains and operates the server 18 and user terminal 2. If the user's account is held with that financial institution, the server 18 processes the message and debits the user's account in the amount of the cash withdrawal. The server 18 also identifies the merchant, either from a merchant identifier or from a user terminal identifier included with the message, and credits a financial account held with the financial institution by the merchant, in the amount of the cash withdrawal transaction. As the transaction is an ATM-type cash withdrawal transaction the merchant is not usually charged a fee as would be the case for a POS or credit card transaction but the merchant may instead be paid a small fee.

The settlement of the cash withdrawal by the financial institution can be understood to comprise a pair of back-to-back transactions, in which the users account is debited in the amount of the cash withdrawal and the merchant's account is credited with the amount of the cash withdrawal. The transactions may take place substantially simultaneously.

Next, the server 18 sends an authorisation message back to the terminal indicating that the cash withdrawal transaction has been authorised.

An ATM application running on a known ATM would, in response to the receipt of an authorisation message received from the server, control a cash handling mechanism included in the ATM to extract the appropriate amount of cash from a cash store within the ATM and output the extracted cash via a cash slot on the ATM. In contrast, the embodiment of FIG. 1 does not include any cash store or cash handling mechanism. Instead, once the authorisation message is received from the server 18, the module 36 at stage 48 instructs the printer 14 to print a token, in this case in the form of a paper slip 60, and outputs the token to the user.

Figure 3:
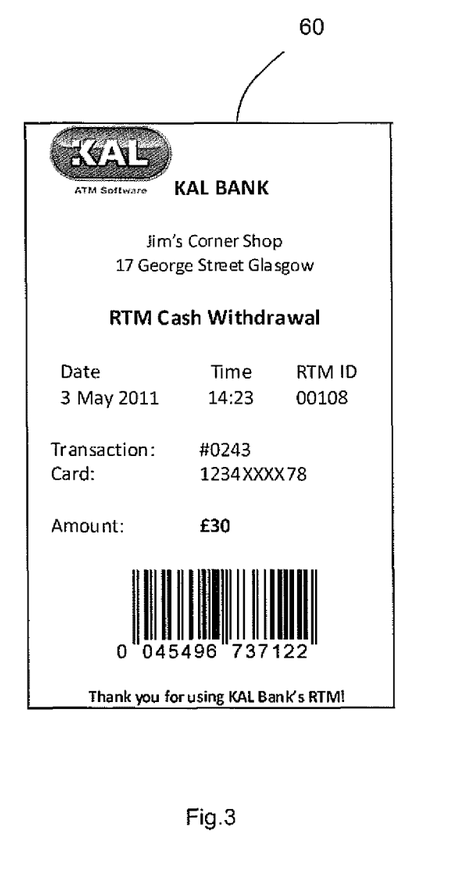
FIG. 3 is a schematic illustration of a token according to an embodiment.

The printed token 60 output to the user is illustrated schematically in FIG. 3. The token 60 in this case includes in human-readable form the current date, a merchant identifier number which identifies the merchant within whose premises the user terminal 2 is installed, and the amount of the approved cash withdrawal, together with a bar code. The bar code usually represents in machine-readable form some or all of the data included in human-readable form on the token, and may also represent a transaction security number that uniquely identifies the transaction. In alternative embodiments the bar code may be a Quick Response (QR) code.

In an alternative mode of operation, the user's account may be debited when the transaction takes place, and the merchant's account may be credited periodically (for example, every hour or every day) by an amount representative of the sum of all user transactions that have taken place during that period. Such periodic, rather than transaction-responsive, crediting of the merchant's account may avoid situations in which the merchant's account has to be debited in response to a transaction having to be reversed or cancelled for example due to a fault with the terminal. However, it is expected that such transaction reversals or cancellations would be rare. Such reversals or cancellations for known ATMs can be due to faults with the ATM during the cash dispensing operation, for example due to a fault with the cash handling mechanism or a lack of cash. Such issues are expected to be rare for the terminal of FIG. 1 as it has a simple structure and does not include a cash store or cash handling mechanism.

The crediting and debiting of user's and merchants accounts (or vice versa) can be performed in different ways in different embodiments. In one embodiment, the user terminal 2 transmits a cash withdrawal transaction message representative of a particular cash withdrawal transaction to the server 18, and also transmits to the server 18 a separate cash deposit transaction message representative of a deposit to the merchant's account. Each of the cash withdrawal and cash deposit transaction messages may be of a standard format, and may be processed by the financial institution's usual transaction processing software at the server running in the usual way.

In an alternative embodiment, the user terminal transmits a customised message that is representative of both the cash withdrawal from the user's account and the cash deposit to the merchant's account (or vice versa) and includes an indicator indicating that the message represents a back-to-back withdrawal and deposit transaction. The financial institution's usual transaction processing software is modified in order to recognise and process such customised transaction messages.

In a further alternative embodiment, dedicated software is installed at the financial institution's software and runs in parallel with the financial institution's usual transaction processing software. The dedicated software may be installed and maintained by a manufacturer or operator of the user terminal 2. In that further alternative embodiment, the user terminal transmits a customised message that is representative of either or both the cash withdrawal from the user's account and the cash deposit to the merchant's account (or vice versa). The dedicated software processes the customised message and then passes instructions to the financial institution's usual transaction processing software to process the cash deposit and/or cash withdrawal transaction in the usual way.

In a variant of the further alternative embodiment, a cash withdrawal transaction message is sent directly to the financial institution's usual transaction processing software by the user terminal and is processed in the usual way, whereas the cash deposit transaction message is sent to the dedicated software, which processes the customised message and then passes instructions to the financial institution's usual transaction processing software to process the cash deposit. The cash deposit transaction message may, for example, represent a single cash deposit and be sent in response to the transaction at the user terminal 2, or may represent the sum of a series of cash deposits and may be sent periodically (for example once per day or once per week).

Usually, if a merchant is allowed to install the user terminal 2 in their premises then they will be required to hold a financial account with a financial institution responsible for the user terminal 2. In contrast, the user may hold the financial account with any of a large number of different financial institutions. If the server 18 determines from the cash withdrawal transaction message that the user's financial account is held with a financial institution other than that of the server 18, then the message is forwarded to a server 38 associated with that other financial institution, using known financial network communication and payment settlement techniques. The financial institution can be identified by the server 18 from a BIN number or PAN number included in the cash withdrawal transaction message. Settlement may occur via a known International settlement system, for example operated by Visa or Mastercard, and there may be no direct contact between the financial institution responsible for the terminal and the financial institution holding the user's account (which may be referred to as the Acquirer bank and the Issuer bank). Alternatively, the financial institutions (for example, the Acquirer bank and the Issuer bank) may have a direct relationship in which case transaction messages may be sent directly between the banks, without the use of an intermediary such as Visa or Mastercard.

The server 38 then debits the account of the user in the amount of the cash withdrawal transaction. The financial institution associated with the server 38 also pays an interchange fee to the financial institution that operates the user terminal 2 and the server 18, in the same way that such an interchange fee would be paid to a financial institution that operates an ATM if the cash withdrawal transaction had been performed using such an ATM.

Returning to the actions of the user and the merchant, the user takes the token 60 from the user terminal 2 and hands the token 60 to the merchant, or an employee of the merchant, who checks the date and the merchant identifier, and then retrieves cash in the amount of the authorised cash withdrawal (in this case $50) from the cash register 3 and passes the cash to the user. The token may then be disposed of or the merchant may retain the token for his records.

In an alternative embodiment, the token 60 is for time limited use, and an expiry time (for example, 14.38) or expiry period (for example, 15 minutes) is printed on the token 60. The user must exchange the token for cash by the expiry time or within the expiry period. After the expiry time or the end of the expiry period, the merchant may refuse to exchange the token 60 for cash. In that case, the merchant and/or user may call the financial institution and arrange for the transaction to be cancelled.

By providing a user terminal such as that of the embodiment of FIG. 1, ATM-type functionality can be provided without requiring installation of an ATM that contains large quantities of cash, associated security features and cash handling mechanisms. There is less risk than with an ATM that a third party would attempt to physically remove the user terminal of FIG. 1 or break open the user terminal in order to obtain cash, as the user terminal does not contain any cash. The user terminal does include anti-tampering and monitoring technology to ensure that a third party cannot access the processor or interfere with the transaction processes. However, the heavy physical casing and weighting of known ATMs is not required for the user terminal. That can be particularly useful in enabling the installation of the user terminal in remote areas.

As the user terminal does not contain cash, the financial institution or the body responsible for installation and maintenance of the user terminal will generally be more willing to allow installation of the user terminal in a merchant's premises than would be the case for an ATM containing cash. Furthermore, as the transaction process can be performed under control of the financial institution using the user terminal in an automated fashion, the more complex administrative requirements and checks required when establishing a bank agent network may not be required. The transaction process is administered by the financial institution via the user terminal, and the only requirement of the merchant is to hand over cash in return for a token. It is relatively easy to determine whether a merchant is performing acceptably, based on any complaints received by users or any evidence of tampering with the user terminal. In the case of complaints received by users that a merchant has not provided cash in return for a token, or in the case of evidence of tampering with the user terminal, the user terminal can be removed and relationship with the merchant can be terminated.

The fact that the user terminal performs financial transactions as ATM-type transactions rather than POS transactions can make installation of a user terminal attractive to a merchant, as the merchant is generally not charged for transactions performed using the user terminal. In contrast a merchant will be charged for a POS transaction. The presence of a user terminal can attract users to merchant premises, and users may make additional impulse purchases when on the merchant premises. Furthermore, as the merchant is issuing cash to customers in connection with the cash withdrawal processes performed by the terminal, and in return the merchant's account is credited in the amount of the cash withdrawals, the frequency with which the merchant needs to take cash to his own bank for deposit is reduced. That in turn reduces costs and increases convenience for the merchant.

The fact that the user terminal performs financial transactions as ATM-type transactions is also attractive to the financial institution responsible for the user terminal, as such transactions can be handled using already-installed systems. Furthermore, the financial institution may receive an interchange fee when the user terminal is used by an account holder of another financial institution. The interchange fee would usually be higher for foreign card holders than for domestic card holders.

In the embodiment of FIG. 1, the token is in the form of a printed paper slip 60. In alternative embodiments any suitable token can be used. In some embodiments, the user terminal 2 is connected electronically to the cash register 3 and the token is in the form of an electronic message sent from the terminal 2 to the cash register 3.

In some circumstances the merchant may determine that he may run short of cash and does not wish to issue cash to customers in connection with cash withdrawal processes performed by the terminal. In certain embodiments, an out-of-cash switch is provided at the terminal. When the switch is enabled, the terminal will display a message saying that cash withdrawals are not available and will not allow withdrawal transactions to be selected from the selection menu displayed by the terminal. The switch may be a physical switch or may be implemented solely in software. For example, in some such embodiments the merchant may select the out-of-cash option by inserting his card into the terminal and then selecting a control menu that is accessible to the merchant but not to customers, and selecting the out-of-cash option via the menu.

Although operation of the user terminal of FIG. 1 has been described in relation to the performance of a cash withdrawal transaction, the user terminal 2 can also be used to perform any other suitable transactions, including for example checking of an account balance, or changing of a PIN. The user terminal 2 can also be used to perform a deposit transaction instead of a cash withdrawal transaction. In that case, the process performed by the terminal may be similar to that described in relation to a cash withdrawal transaction, but cash is handed from the user to the merchant, and the crediting and debiting of the user and merchant accounts is the reverse of that described for the cash withdrawal transaction.

In one mode of operation for performing a cash deposit, the user inserts the user card and enters his PIN to begin a transaction. The user then selects the cash deposit option from the menu of transactions offered by the terminal 2. The user specifies the amount of cash that he wishes to deposit. A token, for example a paper slip, is output to the merchant by the terminal 2 indicating, for example, the current date, a merchant identifier number which identifies the merchant within whose premises the user terminal 2 is installed, and the amount of the approved cash deposit, together with a bar code. The bar code usually represents in machine-readable form some or all of the data included in human-readable form on the token, and may also represent a transaction security number that uniquely identifies the transaction. In alternative embodiments the bar code may be a Quick Response (QR) code.

The module 32 then transmits a cash deposit transaction message to the server 18. It is a feature of the embodiment of FIG. 1 that the cash deposit transaction message is of the same or similar form as a standard cash deposit transaction message that may be issued by a known ATM in respect of a known ATM cash deposit transaction. The message includes the user's account number and encrypted PIN block, details of the requested transaction type and amount, and may include status information about the transaction device.

The cash deposit transaction message is received at the server 18, which determines whether the user's account is held with the financial institution that maintains and operates the server 18 and user terminal 2. If the user's account is held with that financial institution, the server 18 processes the message and credits the user's account in the amount of the cash deposit. The server 18 also identifies the merchant, either from a merchant identifier or from a user terminal identifier included with the message, and debits a financial account held with the financial institution by the merchant, in the amount of the cash deposit transaction. As the transaction is an ATM-type cash deposit transaction the merchant may be paid a small fee.

The settlement of the cash deposit by the financial institution can be understood to comprise a pair of back-to-back transactions, in which the user's account is credited in the amount of the cash deposit and the merchant's account is debited with the amount of the cash deposit. The transactions may take place substantially simultaneously.

Usually, if a merchant is allowed to install the user terminal 2 in their premises then they will be required to hold a financial account with a financial institution responsible for the user terminal 2. In contrast, the user may hold the financial account with any of a large number of different financial institutions. If the server 18 determines from the cash deposit transaction message that the user's financial account is held with a financial institution other than that of the server 18, then the deposit transaction will be denied.

In an alternative embodiment, deposits may be allowed even though the user holds his or her account with a financial institution other than that responsible for the user terminal 2. In that case, crediting of the user's account may be performed via a known International settlement system, for example operated by Visa or Mastercard, or in accordance with direct relationships between the financial institutions as already described in relation to a cash withdrawal transaction.

Different arrangements for the sending of messages between the user terminal 2 and the server 18, and for the processing and settlement of transactions, in alternative embodiments have already been described above in relation to a cash withdrawal transaction. The same or similar arrangements and processes can be used for the processing and settlement of cash deposit transactions in such alternative embodiments.

In most cases, cash withdrawal and cash deposit transactions can be performed successfully based on a level of trust between the user and the merchant. For example, in the case of a cash withdrawal transaction it is likely to be rare for a merchant to refuse to provide cash to a user in exchange for the token 60. Any such instances are likely to be the subject of complaint by the user and are unlikely to remain undiscovered or unresolved.

There may be greater risks of error on the part of the user in particular in relation to cash deposit transactions, although again in practice deliberate fraud may be relatively rare. For example, a user may perform a cash deposit transaction using the terminal but then may omit, either deliberately or in error, to actually deposit the cash with the merchant. In alternative embodiments additional security measures are provided that can reduce the risks of errors or fraud occurring. Such measures may be used for either or both cash withdrawal or cash deposit transactions.

For example, in one alternative embodiment the cash deposit transaction process is altered so that the terminal prompts the user during the process to request the merchant to insert a card representing the merchant's account, or to otherwise provide a card or other merchant device to be read. The user must then ask the merchant to come to the terminal and insert his or her card or provide some other type of merchant device to be read. If the merchant's card or other device is not inserted or read then the cash deposit process is aborted by the terminal. By requiring the merchant to insert his or her card, the merchant is alerted to the fact that a cash deposit process is being performed and it is then more difficult for the user to leave the merchant's premises without depositing the amount of cash in question with the merchant. Similarly, it is more difficult for the merchant subsequently to claim falsely that the cash has not been deposited with him or her if it can be proved, via the insertion of the merchant's card, that he or she was aware that the cash deposit transaction was taking place.

In a variant of the alternative embodiment described in the preceding paragraph, the merchant is required to enter his or her PIN as well as inserting his or her card or providing his or her merchant device to be read.

The alternative embodiment may also be configured to require the insertion of the merchant's card for performance of cash withdrawal transactions as well as cash deposit transactions in some mode of operation, if desired.

The user terminal 2 usually logs data representative of each transaction that occurs, and may also log data concerning periodic error checks or monitoring procedures run by the terminal to check its own operation. The logged data may include data representative of the time a transaction took place, and each action that was performed during a transaction. The data may be stored as journal data and such data can be used to later to verify that a particular transaction has taken place, for example in the case of a query from a user or merchant. The journal data is stored locally at the terminal 2 and is also transmitted to the server, either periodically or in response to performance of a transaction. Similar logging and transmission of journal data is performed by ATM terminals.

In a further alternative embodiment, the user terminal 2 includes a video camera and video camera control module (not shown). The video camera is aligned to film a user in front of the terminal in the position that the user would be in when performing a transaction. The video camera control module is configured so as to automatically record video data during at least some parts of each cash withdrawal transaction or cash deposit transaction. The resulting video data is logged as video journal data and forms part of the record of each transaction.

It is a feature of the further alternative embodiment that the application module 34 displays a message at the appropriate point during a cash withdrawal or cash deposit transaction process to prompt the user to call the merchant to stand in front of the terminal together with the user so that the transfer of cash between the user and the merchant can be recorded by the video camera. The resulting video data is then logged by the terminal as video journal data forming part of the record of the transaction.

The user may, in some modes of operation, be prompted to press a button on the terminal (for example a touch screen button) when the merchant is in position and to press the button again once the transfer of cash has been completed. The video camera may then record the video data for the period between the two button presses and log the data as the video journal data forming part of the record of the transaction.

The video journal data is usually transmitted to the server along with other logged data, either periodically or in response to a transaction having been performed. The video journal data can be used to verify that a cash transfer between a user and merchant actually took place, if necessary.

The user terminal 2 of FIG. 1 includes a printer 14 for printing the token 60. In an alternative embodiment, the printer 14 is a known ATM receipt printer, which is used both for the printing the token 60 and for printing a receipt in respect of the cash withdrawal transaction. In a further alternative embodiment, a printer 14 and a separate receipt printer are provided, the printer 14 is used to print the token 60, and the receipt printer is used to print a receipt for the transaction.

Although the description of various embodiments have included reference to a user's financial transaction card it will be understood that in alternative embodiments any other type of user device associated with an account may be used, for example a fob or RFID device.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A user terminal for performing at least one of a cash withdrawal transaction or a cash deposit transaction comprising:
   a reader for reading a user device;
   a processing resource configured to obtain from the user device account data representative of a financial account associated with the user device, and to receive a user request for one of a cash withdrawal or a cash deposit in respect of the account;
   an output device configured to at least one of a) or b):
   a) issue, in response to the user request for a cash withdrawal, a cash withdrawal token that is exchangeable for cash with a further party at whose premises the user terminal is installed;
   b) issue, in response to the user request for a cash deposit a cash deposit token that is representative of the amount of the cash deposit and/or that identifies the further party at whose premises the user terminal is installed and to whom the cash is to be provided by the user; and
   a communications resource, wherein
   the processing resource is configured to send at least one message via the communications resource, and the at least one message is representative of a request to debit or credit the financial account of the user in respect of the transaction;
   the processing resource is also configured to send at least one message to credit or debit a further financial account in respect of the same transaction, wherein the further financial account is in the name of said further party, and wherein the at least one message to credit or debit said further financial account is sent when the transaction takes place or at a later time or wherein the at least one message to credit or debit said further financial account is representative of a plurality of transactions including said transaction;
   the user terminal comprises a data store storing an identifier that identifies the further party as being associated with the user terminal; and
   the further party is authorised to provide cash to the user in exchange for the cash withdrawal token.

2. The user terminal according to claim 1, wherein the user terminal does not include at least one of a cash storage device or a cash handling mechanism.

3. The user terminal according to claim 1, wherein the user terminal is configured to operate in accordance with an ATM protocol.

4. The user terminal according to claim 1, wherein the user terminal is configured to not issue cash to the user upon performance of the cash withdrawal transaction.

5. The user terminal according to claim 1, wherein the user terminal is configured to not receive cash from the user upon performance of the cash deposit transaction.

6. The user terminal according to claim 1, wherein the processing resource is configured to perform a plurality of transactions with respect to a plurality of users, and to send said at least one message to at least one financial institution to credit or debit the account of the further party in the amount of a sum of the plurality of the transactions.

7. The user terminal according to claim 1, wherein the at least one message comprises at least one message in an ATM protocol message format.

8. The user terminal according to claim 1, wherein the token is exchangeable with the a further party for the amount of the transaction.

9. The user terminal according to claim 1, wherein the user terminal is configured to require the reading of a further user device associated with the further party in order to complete the cash withdrawal transaction or the cash deposit transaction.

10. The user terminal according to claim 1, further comprising a video camera wherein the processing resource is configured to prompt the user to request the further party to exchange cash with the user in a position that is within the field of view of the video camera, and the processing resource is further configured to log video data obtained from the video camera.

11. The user terminal according to claim 10, wherein the processing resource is configured to prompt the user to provide at least one user input when the exchange is about to occur and/or when the exchange has been completed.

12. The user terminal according to claim 1, wherein the token comprises a time indicator that is representative of a duration of validity of the token.

13. The user terminal according to claim 1, wherein the output device comprises a printer and the token comprises a printed token.

14. The user terminal according to claim 1 that is configured to issue a receipt representative of the transaction, wherein the receipt is separate from the token.

15. The user terminal according to claim 14, further comprising a receipt printer that is separate from the output device configured to issue the token.

16. The user terminal according to claim 1, wherein the token comprises at least one of a paper token or an electronic token.

17. The user terminal according to claim 16, wherein the token comprises at least one of a bar code or a Quick Response (QR) code.

18. The user terminal according to claim 17, wherein the bar code or QR code represents at least one of a merchant identifier number, an amount of cash withdrawal or deposit, a date, a transaction security number.

19. The user terminal according to claim 1, further comprising a housing and at least one sensor for detection of tampering with the housing.

20. The user terminal according to claim 1, further comprising a system for performing at least one of a cash withdrawal transaction or a cash deposit transaction, and a server that is configured to communicate with the user terminal.

21. The user terminal according to claim 1, wherein the user terminal is connected electronically to a cash register and the token is in the form of an electronic message sent from the terminal to the cash register.

22. A method of performing a cash withdrawal transaction comprising:
   reading a user device;
   obtaining from the user device account data that is representative of a financial account associated with the user device,
   receiving a request for a cash withdrawal in respect of the account;
   debiting the account in the amount of the transaction;
   issuing in response to the request for a cash withdrawal a token that is exchangeable for cash with a further party at whose premises the user terminal is installed; and
   sending at least one message to credit or debit a further financial account in respect of the same transaction, wherein the further financial account is in the name of said further party, and wherein the at least one message to credit or debit said further financial account is sent when the transaction takes place or at a later time or wherein the at least one message to credit or debit said further financial account is representative of a plurality of transactions including said transaction, wherein the further party is authorised to provide cash to the user in exchange for the cash withdrawal token.

23. A method of performing a cash deposit transaction comprising:

reading a user device;

obtaining from the user device account data that is representative of a financial account associated with the user device, receiving a request for a cash deposit in respect of the account;

crediting the account in the amount of the transaction;

issuing in response to the request for a cash deposit a token that is representative of the amount of the cash deposit and/or that identifies a further party at whose premises the user terminal is installed and to whom the cash is to be provided by the user; and sending at least one message to credit or debit a further financial account in respect of the same transaction, wherein the further financial account is in the name of said further party, and wherein the at least one message to credit or debit said further financial account is sent when the transaction takes place or at a later time or wherein the at least one message to credit or debit said further financial account is representative of a plurality of transactions including said transaction.

24. A user terminal for performing a cash withdrawal transaction comprising:

a reader for reading a user device;

a processing resource configured to obtain from the user device account data representative of a financial account associated with the user device, and to receive a user request for a cash withdrawal in respect of the account;

an output device configured to issue, in response to the user request for a cash withdrawal, a cash withdrawal token that is exchangeable for cash with a further party at whose premises the user terminal is installed; and a communications resource, wherein the processing resource is configured to send at least one message via the communications resource, and the at least one message is representative of a request to debit or credit the financial account of the user in respect of the transaction;

the processing resource is also configured to send at least one message to credit or debit a further financial account in respect of the same transaction, wherein the further financial account is in the name of said further party, and wherein the at least one message to credit or debit said further financial account is sent when the transaction takes place or at a later time or wherein the at least one message to credit or debit said further financial account is representative of a plurality of transactions including said transaction;

the user terminal comprises a data store storing an identifier that identifies the further party as being associated with the user terminal;

the further party is authorised to provide cash to the user in exchange for the cash withdrawal token.

25. A user terminal for performing a cash deposit transaction comprising:

a reader for reading a user device;

a processing resource configured to obtain from the user device account data representative of an account associated with the user device, and to receive a user request for a cash deposit in respect of the account; and an output device configured to issue, in response to the user request for a cash deposit a cash deposit token that is representative of the amount of the cash deposit or identifies a further party at whose premises the user terminal is installed and to whom the cash is to be provided by the user; and a communications resource, wherein the processing resource is configured to send at least one message via the communications resource, and the at least one message is representative of a request to debit or credit the financial account of the user in respect of the transaction;

the processing resource is also configured to send at least one message to credit or debit a further financial account in respect of the same transaction, wherein the further financial account is in the name of said further party, and wherein the at least one message to credit or debit said further financial account is sent when the transaction takes place or at a later time or wherein the at least one message to credit or debit said further financial account is representative of a plurality of transactions;

the user terminal comprises a data store storing an identifier that identifies the further party as being associated with the user terminal.

* * * * *